United States Patent
Overby et al.

(10) Patent No.: US 7,630,369 B1
(45) Date of Patent: Dec. 8, 2009

(54) SYSTEM AND METHOD FOR NETWORK STORAGE PRIORITIZATION OF DEMAND-PAGE OPERATIONS

(75) Inventors: Mark A. Overby, Bothell, WA (US); Andrew Currid, Alameda, CA (US)

(73) Assignee: NVIDIA Corporation, Santa Clara, CA (US)

( * ) Notice: Subject to any disclaimer, the term of this patent is extended or adjusted under 35 U.S.C. 154(b) by 594 days.

(21) Appl. No.: 11/611,790

(22) Filed: Dec. 15, 2006

(51) Int. Cl.
H04L 12/28 (2006.01)

(52) U.S. Cl. .............. 370/389; 370/489; 710/300; 709/203; 709/217

(58) Field of Classification Search ............... None
See application file for complete search history.

(56) References Cited

U.S. PATENT DOCUMENTS

| 7,310,696 | B1* | 12/2007 | Haechten et al. | 710/311 |
| 2004/0030757 | A1* | 2/2004 | Pandya | 709/217 |
| 2004/0030770 | A1* | 2/2004 | Pandya | 709/223 |
| 2004/0267902 | A1* | 12/2004 | Yang | 709/217 |
| 2005/0044162 | A1* | 2/2005 | Liang et al. | 709/212 |
| 2005/0210098 | A1* | 9/2005 | Nakamichi et al. | 709/203 |
| 2008/0126663 | A1* | 5/2008 | Murakami et al. | 710/311 |

* cited by examiner

Primary Examiner—Bob A Phunkulh
(74) Attorney, Agent, or Firm—Patterson & Sheridan, LLP

(57) ABSTRACT

One embodiment of the present invention sets forth a technique for establishing high user priority for Ethernet frames related to demand-paging operations over iSCSI. The iSCSI initiator is configured to identify demand-page operations using techniques specific to the operating system and to set the 802.1q tag control information (TCI) user priority bit field to reflect high priority for demand-page related Ethernet frames. The demand-page related Ethernet frames are then delivered to the iSCSI target with a higher priority through the intervening Ethernet network than other traffic. Overall performance of demand paging operations is improved relative to prior art systems through an average reduction in network latency.

21 Claims, 3 Drawing Sheets

SYSTEM AND METHOD FOR NETWORK STORAGE PRIORITIZATION OF DEMAND-PAGE OPERATIONS

BACKGROUND OF THE INVENTION

1. Field of the Invention

Embodiments of the present invention relate generally to computer networks and more specifically to a system and method for network storage prioritization of demand-page operations.

2. Description of the Related Art

In certain computing environments, storage resources on at least one storage server are provided through an Ethernet network to one or more client computing devices. The client computing devices gain access to non-volatile mass storage resources on the storage sever through a block-level protocol, such as Internet small computer system interface (iSCSI).

In an example scenario, a cluster of client computing devices communicates with a storage server through an Ethernet network, where each client computing device accesses one or more virtual disks on the storage server. In such a scenario, a given client computing device is configured to establish an iSCSI login session with the storage server and to access one or more specifically named virtual disks. The client computing device is able to interpret the block and file system structure of the virtual disk, which typically follows the block and file system structure of an otherwise locally attached disk drive. The client computing devices, along with other computing systems that share the Ethernet network, commonly run user applications such as web browsers, web servers, email client-server systems, and voice over IP (VoIP) applications. These user applications, which are generally less sensitive to latency, contribute a mix of non-iSCSI traffic that competes with iSCSI traffic for instantaneous bandwidth over the Ethernet network. However, certain configurations of client computing devices, such as diskless computing devices, perform latency-sensitive demand-paging operations through the Ethernet network using iSCSI.

Thus, one drawback of existing iSCSI network architectures is that demand-paging iSCSI traffic is forced to compete on an equal basis with other, lower-priority network traffic, leading to suboptimal demand-paging performance. For example, demand-page requests are typically marked with an operating system-specific flag, such as the "paging I/O flag" used within the Microsoft™ Windows™ operating system, but there is no way to prioritize demand-paging iSCSI traffic relative to other lower-priority Ethernet network traffic. Consequently, demand-paging iSCSI traffic suffers significant performance problems with the increased network latencies caused by lower-priority traffic.

As the foregoing illustrates, what is needed in the art is a more efficient technique for transmitting demand-page iSCSI traffic over Ethernet to improve the overall performance of applications that generate demand-page iSCSI traffic.

SUMMARY OF THE INVENTION

One embodiment of the present invention sets forth a method for transmitting a demand paging request with an Ethernet user priority. The method includes the steps of receiving a small computer system interface (SCSI) command descriptor block having a flag indicating whether the SCSI command is a demand paging request, assigning the Ethernet user priority to the SCSI command descriptor block based on a state of the flag, generating an internet SCSI (iSCSI) request command descriptor block having the Ethernet user priority based on the SCSI command descriptor block, and transmitting the iSCSI request command descriptor block to a transport control protocol layer for transmission over an Ethernet network.

One advantage of the disclosed method is that it enables Ethernet frames that encapsulate demand paging requests to be delivered through an Ethernet network to an iSCSI target with a higher priority than other types of traffic. Overall performance of demand paging operations is improved relative to prior art systems through an average reduction in network latency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
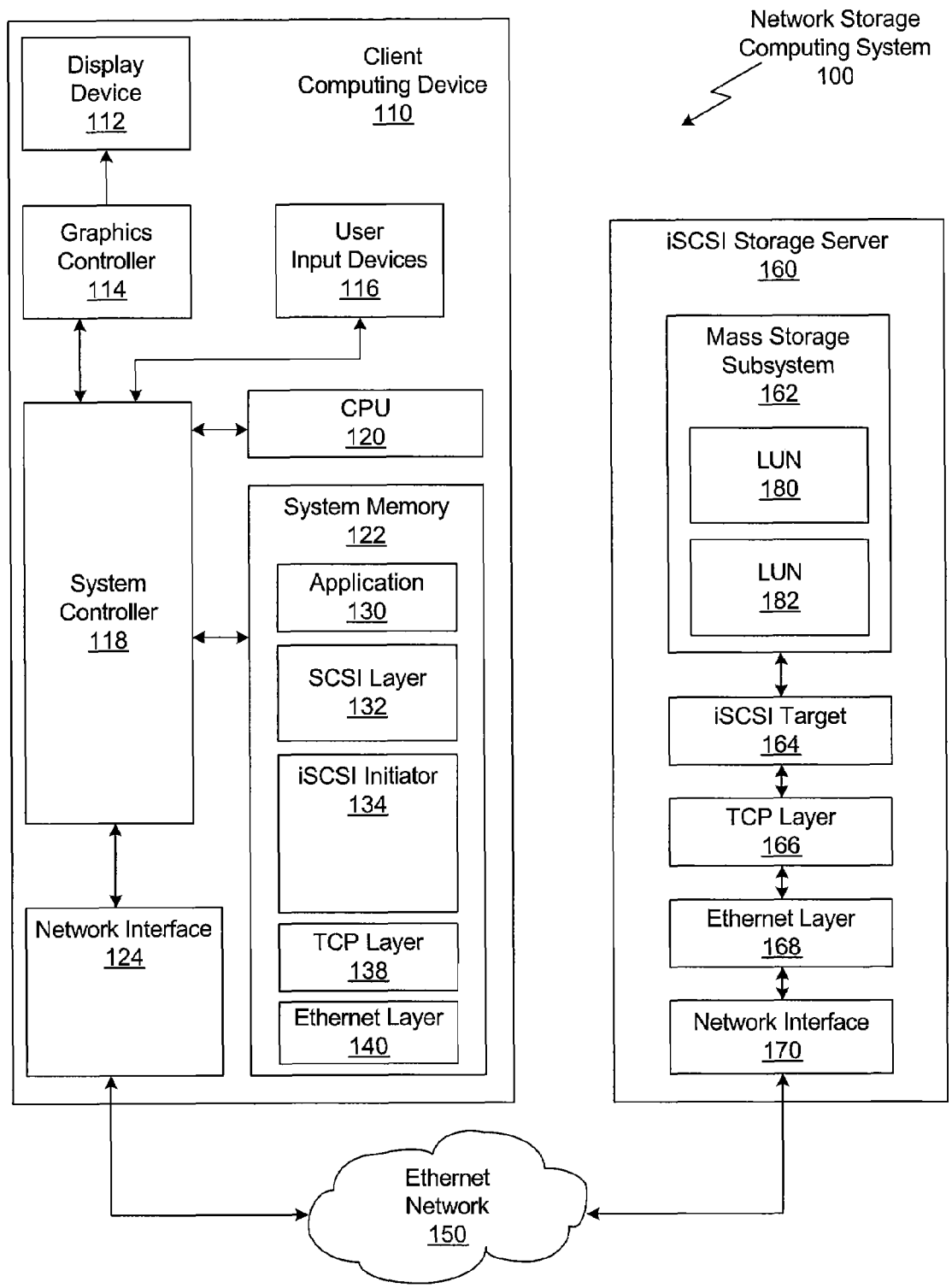
FIG. 1 is a conceptual diagram of a network storage computing system that includes a client computing device connected through an Ethernet network to an iSCSI storage server, according to one embodiment of the invention.

FIG. 1 is a conceptual diagram of a network storage computing system 100 that includes a client computing device 110 connected through an Ethernet network 150 to an iSCSI storage server 160, according to one embodiment of the invention. As shown, the client computing device 110 includes, without limitation, a display device 112, a graphics controller 114, user input devices 116, a system controller 118, a central processing unit (CPU) 120, system memory 122 and a network interface 124. The display device 112 is configured to display frames of data and may be constructed using a liquid crystal display (LCD), cathode ray tube (CRT) or any other suitable display technology.

The graphics controller 114 generates display refresh signals as required by the display device 112. The graphics controller 114 receives graphics display commands from the CPU 120 via the system controller 118, which bridges communications between major functional blocks within the client computing device 110. The user input devices 116 allow a user to enter data into the client computing device 110. User input devices 116 may include, without limitation, a computer keyboard, mouse, joystick, trackball or capacitive input pad. The system controller 118 includes interfaces for the different hardware components within the client computing device 110 and bridges access between the hardware components. The CPU 120 executes programming instructions, residing primarily in system memory 122, used to manage and operate the client computing device 110. The system memory 122 provides storage of programming instructions and data. System memory 112 may include dynamic random access memory (DRAM) or any other appropriate memory technology. The network interface 124 provides connectivity to the Ethernet network 150 and presents a host bus interface to the system controller 118. In alternate embodiments, two or more of the system components may be incorporated into a single integrated device. For example, the CPU 120, system controller 118, graphics controller 114 and network interface 124 may be incorporated into a single integrated device.

The system memory 122 includes an application 130, a SCSI layer 132, an iSCSI initiator 134, a transmission control protocol (TCP) layer 138 and an Ethernet layer 140. The application 130 implements a set of storage capabilities, such as the functions associated with a file system or a virtual memory paging system. The application 130 generates SCSI commands, such as block storage commands, and transmits these SCSI commands to the SCSI layer 132. As described in greater detail herein, in one embodiment, each block storage command includes a "paging I/O flag" within the Microsoft™ Windows™ operating system to indicate the priority level of the block storage command. If the block storage command is a demand paging request, then the paging I/O flag is set (i.e., is true), and if the block storage command is not a demand paging request, then the paging I/O flag is not set (i.e., is not true). The SCSI layer 132 transmits the SCSI commands to the iSCSI initiator 134, preserving the status of the paging I/O flag for each command. The iSCSI initiator 134 is configured to assign an Ethernet user priority to each SCSI command. In one embodiment, the iSCSI initiator 134 maps one of two IEEE 802.1q user priority levels to each SCSI command based on that status of the paging I/O flag. If the paging I/O flag is true, indicating that the SCSI command is a demand paging request, then the highest 802.1q priority (7) is mapped to the SCSI command. If the paging I/O flag is false, then a lower 802.1q priority, such as "0," is mapped to the SCSI command. The iSCSI initiator 134 also is configured to establish an iSCSI login session to a designated iSCSI target for each of the two Ethernet user priority levels. After the iSCSI login session is established, the iSCSI initiator 134 may transmit each SCSI command received from the SCSI layer 132 to the designated iSCSI target over the session corresponding to the Ethernet user priority associated with the SCSI command.

The TCP layer 138 provides a reliable communications link through the Ethernet network 150. The Ethernet layer 140 provides low level access to and control of the Network interface 124. For example, the Ethernet layer 140 may directly construct and populate an Ethernet frame and the bit fields within the Ethernet frame transmitted by the network interface 124. Such bit fields include, without limitation, the type of Ethernet frame, the source and destination Ethernet address of the frame. Certain types of Ethernet frames, such as IEEE 802.1q Ethernet frames, include a tag control information (TCI) field that includes a user priority bit field of three bits. This user priority bit field encodes eight levels of user priority that are commonly processed by Ethernet switches within the Ethernet network 150, according to the IEEE 802.1p standard. The Ethernet layer 140 may also honor the designated priorities of Ethernet frames generated within the client computing device 110 for transmission by the network interface 124.

The Ethernet network 150 connects the client computing device 110 to the iSCSI storage server 160 and may include Ethernet switches, Ethernet hubs and Ethernet cabling. The Ethernet cabling may include any Ethernet physical transport media such as twisted pair or fiber optical cable. When more than one Ethernet frame is queued up for egress from an Ethernet switch within the Ethernet network 150, frames with higher numeric values encoded in the user priority field are typically transmitted by the Ethernet switch before frames with lower numeric values, imparting a lower average latency on higher priority frames. To avoid complete starvation of lower priority connections, some Ethernet switches use a weighted queuing scheme, such as weighted round-robin, whereby high priority frames are allocated a certain average bandwidth, while low priority frames are allocated a lower average bandwidth.

The iSCSI storage server 160 is a compute platform that includes, without limitation, a network interface 170, an Ethernet layer 168, a TCP layer 166, an iSCSI target 164 and a mass storage system 162. The network interface 170 provides physical connectivity to the Ethernet network 150. The Ethernet layer 168 provides low level access to and control of the Network interface 170. The Ethernet layer 168 receives Ethernet frames from the network interface 170 for processing within the TCP layer 166. The TCP layer 166 provides a reliable communications link through the Ethernet network 150. The iSCSI target 164 receives login requests from the iSCSI initiator 134 that are used to establish access to one or more logical unit numbers (LUNs) 180, 182 included within the mass storage system 162. The iSCSI initiator 134 may access blocks of data within a LUN 180, 182 after the iSCSI target 164 has granted access to the iSCSI initiator 134.

Figure 2:
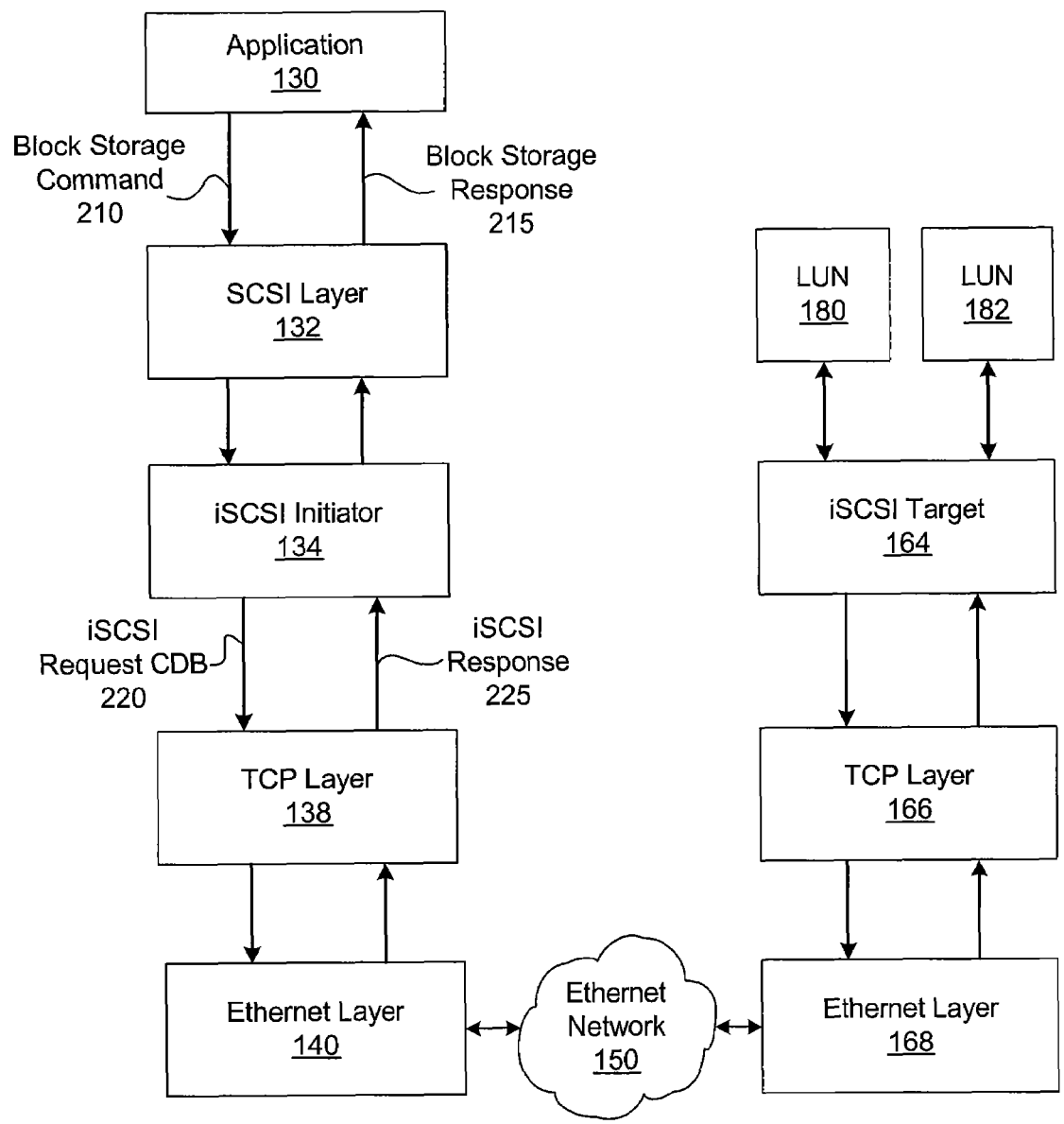
FIG. 2 is a data flow diagram of the network storage computing system, according to one embodiment of the invention.

FIG. 2 is a data flow diagram of the network storage computing system 100, according to one embodiment of the invention. The application 130 generates block storage commands 210 that are transmitted to the SCSI layer 132. In one embodiment, each block storage command 210 has an associated paging I/O flag. If the block storage command 210 is a demand paging request, then the paging I/O flag is set. If the block storage command 210 is not a demand paging request, then the paging I/O flag is not set. The SCSI layer 132 generates a SCSI command descriptor block (CDB) for each block storage command 210. The SCSI layer 132 preserves the state of the paging I/O flag for each SCSI CDB, as initially assigned by the application 130. The SCSI layer 132 then transmits the SCSI CDBs to the iSCSI initiator 134. The iSCSI initiator 134 transforms each SCSI CDB into an iSCSI request CDB 220 for transmission over a TCP connection. As discussed previously, the iSCSI initiator 134 maps the SCSI CDB from the SCSI layer 132 to a corresponding IEEE 802.1q user priority, based to the status of the paging I/O flag. If the paging I/O flag is set, then the iSCSI initiator 134 assigns a high (e.g., a "7") 802.1q user priority to the iSCSI request CDB 220; but, if the paging I/O flag is not set, then the iSCSI initiator 134 assigns a low (e.g., a "0") 802.1q user priority to the iSCSI request CDB. In other words, if the paging I/O flag is set, then the resulting iSCSI request CDB 220 transmitted from the iSCSI initiator 134 has an associated 802.1q user priority that corresponds to the high priority assigned to a demand-paging request. The iSCSI request CDB 220 is then processed by the TCP layer 138, which packages the iSCSI request CDB 220 into a TCP packet. The TCP layer 138 transmits the TCP packet to the Ethernet layer 140, which then encapsulates the TCP packet into one or more Ethernet frames for transmission over the Ethernet network 150.

The Ethernet layer 140 is configured to ascribe, in any technically feasible fashion, the 802.1q user priority associated with each iSCSI request CDB 220 packaged into a TCP packet to the one or more Ethernet frames encapsulating the TCP packet. For example, in one embodiment, the iSCSI initiator 134 is configured to establish an iSCSI session with distinct TCP connections for each 802.1q user priority level, and the TCP layer 138 is configured to associate a specific 802.1q user priority level with each connection, and convey that priority to the Ethernet layer 140 when passing it packets associated with a particular connection. Thus, when the iSCSI initiator 134 transmits an iSCSI request CDB 220 having a given 802.1q user priority, the Ethernet layer 140 transmits the one or more Ethernet frames encapsulating the TCP segments that package the iSCSI request CDB 220 over the TCP connection corresponding to that user priority. In this fashion, an Ethernet priority is ascribed to the iSCSI request CDB 220 that otherwise would have only a single, fixed priority associated with it. Thus, demand paging requests may be transmitted to and processed by the iSCSI storage server 160 faster than in prior art systems, thereby increasing the relative performance of demand paging operations within network storage computing system 100.

The Ethernet network 150 delivers the one or more Ethernet frames that encapsulate the iSCSI request CDB 220 to the Ethernet layer 168. The Ethernet layer 168 passes the one or more Ethernet frames to the TCP layer 166. The TCP layer 166 reconstructs the iSCSI request CDB 220 from the one or more Ethernet frames. The iSCSI target 164 receives the iSCSI request CDB 220 for processing. Again, since demand paging requests are given high Ethernet user priority, these types of iSCSI request CDBs are generally transmitted across the network to the iSCSI storage server 160 faster relative to other types of iSCSI request CDBs. A typical iSCSI request CDB 220 includes a SCSI command to read from or write to a LUN 180, 182. Upon completing the processing of the iSCSI request CDB 220, the iSCSI target 164 generates an iSCSI response 225 for transmission to the iSCSI initiator 134 through the TCP layer 166, Ethernet layer 168, Ethernet network 150, Ethernet layer 140 and TCP layer 138. The iSCSI initiator 134 receives the iSCSI response 225 and, in response, generates a block storage response 215. The application 130 receives the block storage response 215 and continues processing, according to the definition of the application 130 behavior.

As the foregoing illustrates, each command originating within the application 130 includes a task priority level that is higher for demand-paging requests than for other types of requests. The high task priority assigned to a demand paging request by the application 130 is preserved by the iSCSI layer 132. The demand-paging requests are then assigned a high Ethernet user priority within the iSCSI initiator 134. Each iSCSI request CDB generated by the iSCSI initiator 134 is then packaged into a TCP packet that is encapsulated into one or more Ethernet frames. As a result of this sequence, the one or more Ethernet frames include the Ethernet user priority determined by the iSCSI initiator 134. As previously described herein, the Ethernet user priority is based on the state of the paging I/O flag originally set by the application 130 for the command encapsulated in the one or more Ethernet frames. The one or more Ethernet frames are then delivered through the Ethernet network 150 based on the Ethernet user priority. In this fashion, demand paging requests, which have a higher Ethernet user priority, are delivered faster to the iSCSI storage server 160 than other types of commands. On the receiving end, the iSCSI target 164 processes the iSCSI request CDB according to well-known iSCSI target behavior.

Figure 3:
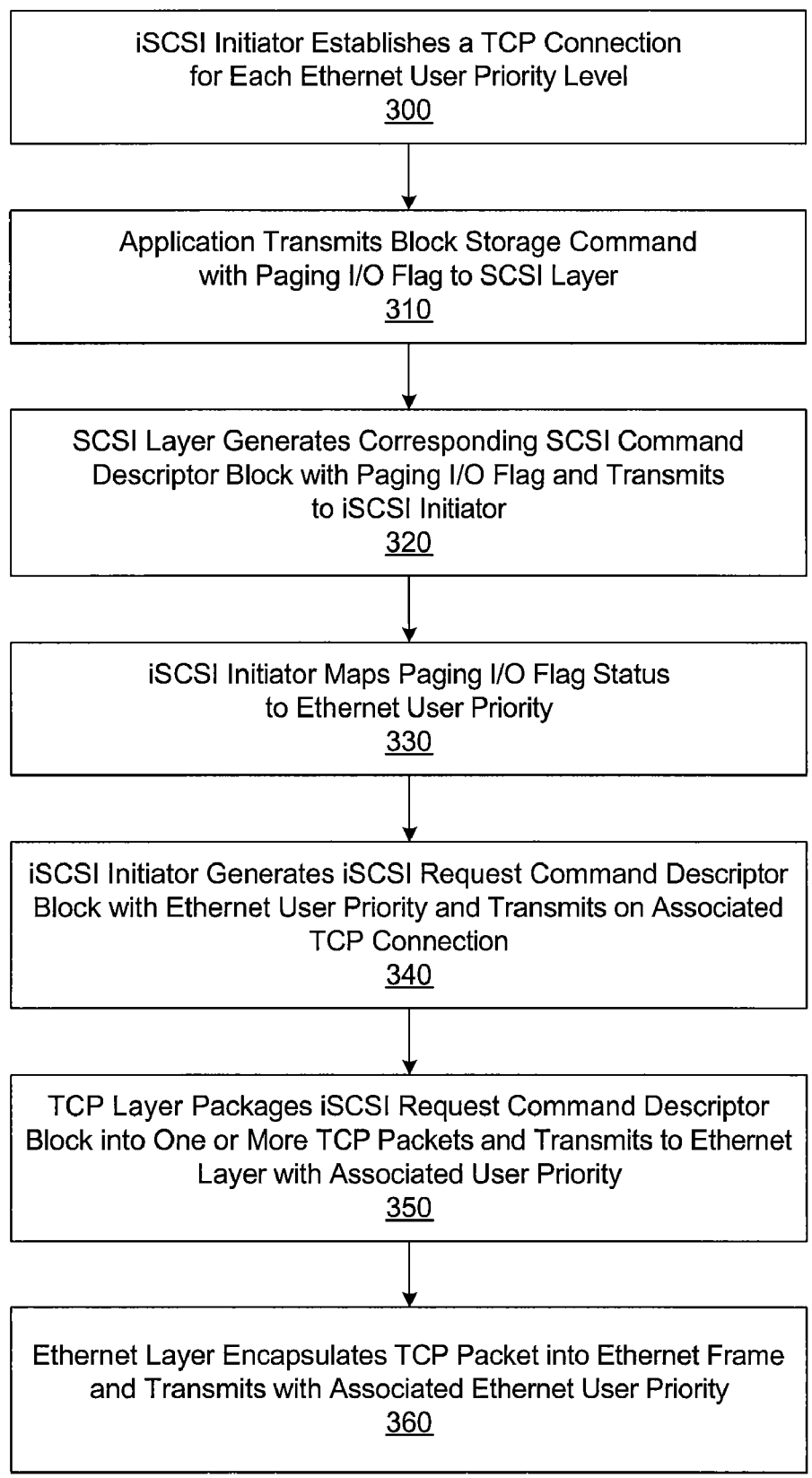
FIG. 3 is a flow diagram of method steps for transmitting a demand page request with an Ethernet user priority, according to one embodiment of the invention.

FIG. 3 is a flow diagram of method steps for transmitting a demand paging request with an Ethernet user priority, according to one embodiment of the invention. Although the method steps are described in conjunction with the systems of FIGS. 1 and 2, persons skilled in the art will understand that any entity or element within the network storage computing system 100, whether implemented in software, hardware or both, that performs the method steps, in any order, is within the scope of the invention.

The method for transmitting the demand paging request begins in step 300, where the iSCSI initiator 134 establishes an iSCSI session with TCP connections for each of two Ethernet user priority levels. For example, in one embodiment, one of the two TCP connections corresponds to the highest 802.1q Ethernet user priority level (7) and the other of the two TCP connections corresponds to the lowest 802.1q Ethernet user priority level (0). In conjunction with establishing each TCP connection, the iSCSI initiator 134 also associates an Ethernet user priority with each TCP connection. In step 310, the application 130 transmits a block storage command with a paging I/O flag to the SCSI layer 132. In step 320, the SCSI layer 132 generates a corresponding SCSI command descriptor block (CDB) having a paging I/O flag that indicates the task priority initially assigned to the block storage command by the application 130. The SCSI layer 132 transmits the SCSI CDB to the iSCSI initiator 134. In step 330, the iSCSI initiator 134 maps the SCSI CDB to a corresponding Ethernet user priority, based on the status of the paging I/O flag. Specifically, when the paging I/O flag is true, the iSCSI initiator 134 maps the SCSI CDB to an Ethernet user priority of 7, and when the paging I/O flag is false, the iSCSI initiator 134 maps the SCSI CDB to an Ethernet user priority of 0. In step 340, the iSCSI initiator 134 generates an iSCSI request CDB with the associated Ethernet user priority and transmits the iSCSI request CDB to the TCP layer 138, for transmission on the connection with the corresponding Ethernet user priority. In step 350, the TCP layer 138 packages the iSCSI request CDB in one or more TCP packets and transmits them to the Ethernet layer 140 with their associated Ethernet user priority. In step 360, the Ethernet layer 140 encapsulates each TCP packet into an Ethernet frame. The Ethernet layer 140 then transmits the Ethernet frames with the Ethernet user priority assigned to the iSCSI request CDB that is encapsulated in them.

In sum, each SCSI command is mapped to one of two IEEE standard 802.1q user priorities within the tag control information (TCI) field of an IEEE 802.1q Ethernet frame, as determined by the status of the paging I/O flag associated with the SCSI command. The iSCSI initiator takes steps to assure that the mapped user priority is applied to all appropriate Ethernet frames. Various techniques can be used to set the Ethernet user priority associated with an iSCSI command. As previously described herein, in one embodiment, the iSCSI initiator may open a TCP/IP connection to the iSCSI target for the two 802.1q priority levels. The TCI field for each TCP/IP connection may then be set using well-known techniques, such as input/output control or "IOCTL" calls, that assign a specific Ethernet user priority to each TCP/IP connection. SCSI commands having Ethernet user priorities reflecting whether the commands are demand paging requests may then be transmitted via the TCP/IP connection corresponding the user priorities assigned to the SCSI commands.

While the forgoing is directed to embodiments of the present invention, other and further embodiments of the invention may be devised without departing from the basic scope thereof, and the scope thereof is determined by the claims that follow.

We claim:

1. A method for transmitting a demand paging request with an Ethernet user priority, the method comprising:
   receiving a small computer system interface (SCSI) command descriptor block having a flag indicating whether the SCSI command is a demand paging request;
   assigning the Ethernet user priority to the SCSI command descriptor block based on a state of the flag;

generating an internet SCSI (iSCSI) request command descriptor block having the Ethernet user priority based on the SCSI command descriptor block; and transmitting the iSCSI request command descriptor block to a transport control protocol layer for transmission over an Ethernet network.

2. The method of claim 1, wherein the flag is set, and the step of assigning comprises assigning a high Ethernet user priority to the SCSI command descriptor block.

3. The method of claim 2, wherein the Ethernet user priority is an 802.1q user priority.

4. The method of claim 3, wherein the 802.1q user priority is 7.

5. The method of claim 1, wherein the flag is not set, and the step of assigning comprises assigning a low Ethernet user priority to the SCSI command descriptor block.

6. The method of claim 5, wherein the Ethernet user priority is an 802.1q user priority.

7. The method of claim 6, wherein the 802.1q user priority is 0.

8. The method of claim 1, further comprising the step of establishing a transport control protocol connection corresponding to the Ethernet user priority.

9. The method of claim 8, further comprising the step of packaging the iSCSI request command block into one or more transport control protocol packet.

10. The method of claim 9, further comprising the steps of encapsulating the transport control protocol packet into one or more Ethernet frames and transmitting the one or more Ethernet frames with the corresponding Ethernet user priority.

11. A computer-readable medium including a set of instructions that when executed by a processor cause the processor to transmit a demand paging request with an Ethernet user priority, by performing the steps of:

receiving a small computer system interface (SCSI) command descriptor block having a flag indicating whether the SCSI command is a demand paging request;

assigning the Ethernet user priority to the SCSI command descriptor block based on a state of the flag;

generating an internet SCSI (iSCSI) request command descriptor block having the Ethernet user priority based on the SCSI command descriptor block; and transmitting the iSCSI request command descriptor block to a transport control protocol layer for transmission over an Ethernet network.

12. A computing device configured to transmit a demand paging request with an Ethernet user priority, the computing device comprising:

a processing unit; and a memory that stores a small computer system interface (SCSI) layer, an internet SCSI (iSCSI) initiator and a transport control protocol layer for execution on the processing unit, wherein the iSCSI initiator is configured to:

receive a SCSI command descriptor block having a flag indicating whether the SCSI command is a demand paging request, assign the Ethernet user priority to the SCSI command descriptor block based on a state of the flag, generate an iSCSI request command descriptor block having the Ethernet user priority based on the SCSI command descriptor block, and transmit the iSCSI request command descriptor block to the transport control protocol layer for transmission over an Ethernet network.

13. The computing device of claim 12, wherein the flag is set, and the iSCSI initiator is configured to assign a high Ethernet user priority to the SCSI command descriptor block.

14. The computing device of claim 13, wherein the Ethernet user priority is an 802.1q user priority.

15. The computing device of claim 14, wherein the 802.1q user priority is 7.

16. The computing device of claim 12, wherein the flag is not set, and the iSCSI initiator is configured to assign a low Ethernet user priority to the SCSI command descriptor block.

17. The computing device of claim 16, wherein the Ethernet user priority is an 802.1q user priority.

18. The computing device of claim 17, wherein the 802.1q user priority is 0.

19. The computing device of claim 12, wherein the iSCSI initiator is further configured to establish a transport control protocol connection corresponding to the Ethernet user priority.

20. The computing device of claim 19, wherein the transport control protocol layer is configured to package the iSCSI request command block into one or more transport control protocol packets.

21. The computing device of claim 20, wherein the memory further stores an Ethernet layer that is configured to encapsulate the transport control protocol packet into one or more Ethernet frames and transmit the one or more Ethernet frames with the corresponding Ethernet user priority.

* * * * *